United States Patent
Sato (10) Patent No.: US 8,320,010 B2
(45) Date of Patent: Nov. 27, 2012

(54) IMAGE FORMING APPARATUS CAPABLE OF SETTING SPECIFIC PROCESS EVERY STORAGE AREA AND INFORMATION PROCESSING METHOD

(75) Inventor: Tetsuya Sato, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 1489 days.

(21) Appl. No.: 11/847,900

(22) Filed: Aug. 30, 2007

(65) Prior Publication Data

US 2008/0062463 A1  Mar. 13, 2008

(30) Foreign Application Priority Data

Sep. 8, 2006  (JP) .................................. 2006-243892

(51) Int. Cl.
   *G06K 15/00* (2006.01)
   *G06F 3/12* (2006.01)
   *G06F 15/16* (2006.01)
   *G06F 15/167* (2006.01)
   *G06F 15/173* (2006.01)
   *G06F 17/30* (2006.01)

(52) U.S. Cl. ...................... 358/1.16; 358/1.15; 358/1.13; 358/1.14; 358/1.18; 709/219; 709/216; 709/217; 709/225; 709/230; 707/758

(58) Field of Classification Search .................. 358/1.16, 358/1.13, 1.14, 1.15, 1.18; 707/758; 709/216, 709/217, 219, 225, 230
See application file for complete search history.

(56) References Cited

U.S. PATENT DOCUMENTS

2003/0208565 A1* 11/2003 Nishihara et al. ............. 709/219
2006/0087680 A1*  4/2006 Maeda .......................... 358/1.15

FOREIGN PATENT DOCUMENTS

| JP | 2000-118095 |   | 4/2000 |
| JP | 2001339588 | A | 12/2001 |
| JP | 2005-182594 |   | 7/2005 |
| JP | 2005-242781 |   | 9/2005 |
| JP | 2006203798 | A | 8/2006 |

* cited by examiner

*Primary Examiner* — Steven Kau
*Assistant Examiner* — Neil R McLean
(74) *Attorney, Agent, or Firm* — Fitzpatrick, Cella, Harper & Scinto (57) ABSTRACT

The invention provides an image forming apparatus and an information processing method, in which when a process for information which is put to each storage area is executed, a loop process which repeats a same specific process while moving the information between the storage areas is limited. When the input of the information to one of the storage areas is detected, whether or not loop information showing a loop state where the same specific process is repeated while moving the information between the storage areas has been set in history information set in attribute information of the input information is discriminated. If it is determined that the loop information is not set in the history information, a first process for executing the specific process is executed. If it is decided that the loop information has been set, a second process different from the first process is executed.

9 Claims, 9 Drawing Sheets

STORING MEDIUM
SUCH AS FD/CD-ROM, ETC.

| DIRECTORY INFORMATION |
|---|
| THE 1ST DATA PROCESSING PROGRAM, PROGRAM CODE GROUP CORRESPONDING TO STEPS IN FLOWCHART SHOWN IN FIG. 3 |
| THE 2ND DATA PROCESSING PROGRAM, PROGRAM CODE GROUP CORRESPONDING TO STEPS IN FLOWCHART SHOWN IN FIG. 4 |
| THE 3RD DATA PROCESSING PROGRAM, PROGRAM CODE GROUP CORRESPONDING TO STEPS IN FLOWCHART SHOWN IN FIG. 5 |
| THE 4TH DATA PROCESSING PROGRAM, PROGRAM CODE GROUP CORRESPONDING TO STEPS IN FLOWCHART SHOWN IN FIG. 8 |
| THE 5TH DATA PROCESSING PROGRAM, PROGRAM CODE GROUP CORRESPONDING TO STEPS IN FLOWCHART SHOWN IN FIG. 9 |
| THE 6TH DATA PROCESSING PROGRAM, PROGRAM CODE GROUP CORRESPONDING TO STEPS IN FLOWCHART SHOWN IN FIG. 10 |
| THE 7TH DATA PROCESSING PROGRAM, PROGRAM CODE GROUP CORRESPONDING TO STEPS IN FLOWCHART SHOWN IN FIG. 13 |
| |

MEMORY MAP IN STORING MEDIUM

FIG. 13

IMAGE FORMING APPARATUS CAPABLE OF SETTING SPECIFIC PROCESS EVERY STORAGE AREA AND INFORMATION PROCESSING METHOD

BACKGROUND OF THE INVENTION

1. Field of the Invention

The present invention relates to an image forming apparatus in which a specific process to be executed for information that is put into one of a plurality of storage areas can be set every storage area or to an information process of an image forming system including such an image forming apparatus.

2. Description of the Related Art

Generally, in a digital hybrid apparatus (multi function peripheral; MFP), image data read out by a scanner or image data obtained by developing PDL data received through a network is stored into a storing apparatus such as a hard disk or the like. There is a digital MFP having a Box function which can read out arbitrary image data from the storing apparatus and print or transmit the image data. In the embodiment, "Box" denotes a specific storage area for storing the data. For example, the Box is constructed by a RAM, an HDD, an auxiliary storing apparatus, or the like.

Further, the image data can be temporarily stored into personal Boxes obtained by individually dividing the storage area in the hard disk every object of the user.

At present, a hot-foldered Box which automatically executes such a process that when a document is put into the Box, it is printed and moved to another Box, or the like, is considered.

As an example of a hot folder function process regarding an information processing apparatus, for example, Japanese Patent Application Laid-Open No. 2005-242781 has been opened. According to such a document, a print setting file for a print file which is stored into the folder has previously been stored, when the print file is stored, the stored print setting file is added to the print file, and the print file is transmitted, thereby realizing the hot folder.

However, according to the foregoing related art, a processing loop due to an erroneous setting which occurs when such a setting that "the image data is printed or transmitted and moved to another hot folder" is made cannot be detected. There is, consequently, such a problem that the same image data is printed onto sheets many times and transmitted many times.

For example, if such a setting that the image data is printed in a Box1 assured in the image forming apparatus and is moved to a Box2 and such a setting that the image data is printed in the Box2 and is moved to the Box1 have been made, such a situation that a same document is printed many times while being moved between the Box1 and the Box2 occurs.

SUMMARY OF THE INVENTION

The invention provides such a mechanism that when a process of information which is put into each storage area is executed, a loop process in which a same specific process is repeated while moving the information between the storage areas is limited and a wasteful process accompanied with the execution of the same process can be limited.

To accomplish the above object, according to the first aspect of the invention, there is provided an image forming apparatus in which a specific process to be executed for information that is put into one of a plurality of storage areas can be set every storage area, comprising: detecting means for detecting the input of the information into one of the storage areas; setting means for setting history information of a process accompanied with the execution of the specific process into attribute information of the information; loop discriminating means for, if the input of the information into one of the storage areas is detected by the detecting means, discriminating whether or not loop information showing a loop state where the same specific process is repeated while moving the information between ones of the storage areas has been set in the history information set into the attribute information of the information which is put; and process executing means for executing a first process to execute the specific process if it is determined by the loop discriminating means that the loop information is not set in the history information and executing a second process different from the first process if it is determined that the loop information has been set.

To accomplish the above object, according to the second aspect of the invention, there is further provided an image forming apparatus in which a specific process to be executed for information that is put into a storage area can be set, comprising: setting means for setting the specific process for a first storage area; and discriminating means for, if the specific process set by the setting means is a process to move data in the first storage area to a second storage area, discriminating whether or not the specific process set for the second storage area is a process to move data in the second storage area to the first storage area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

Exemplary embodiments for embodying the invention will now be described with reference to the drawings.

Description of System Construction

First Embodiment

Figure 1:
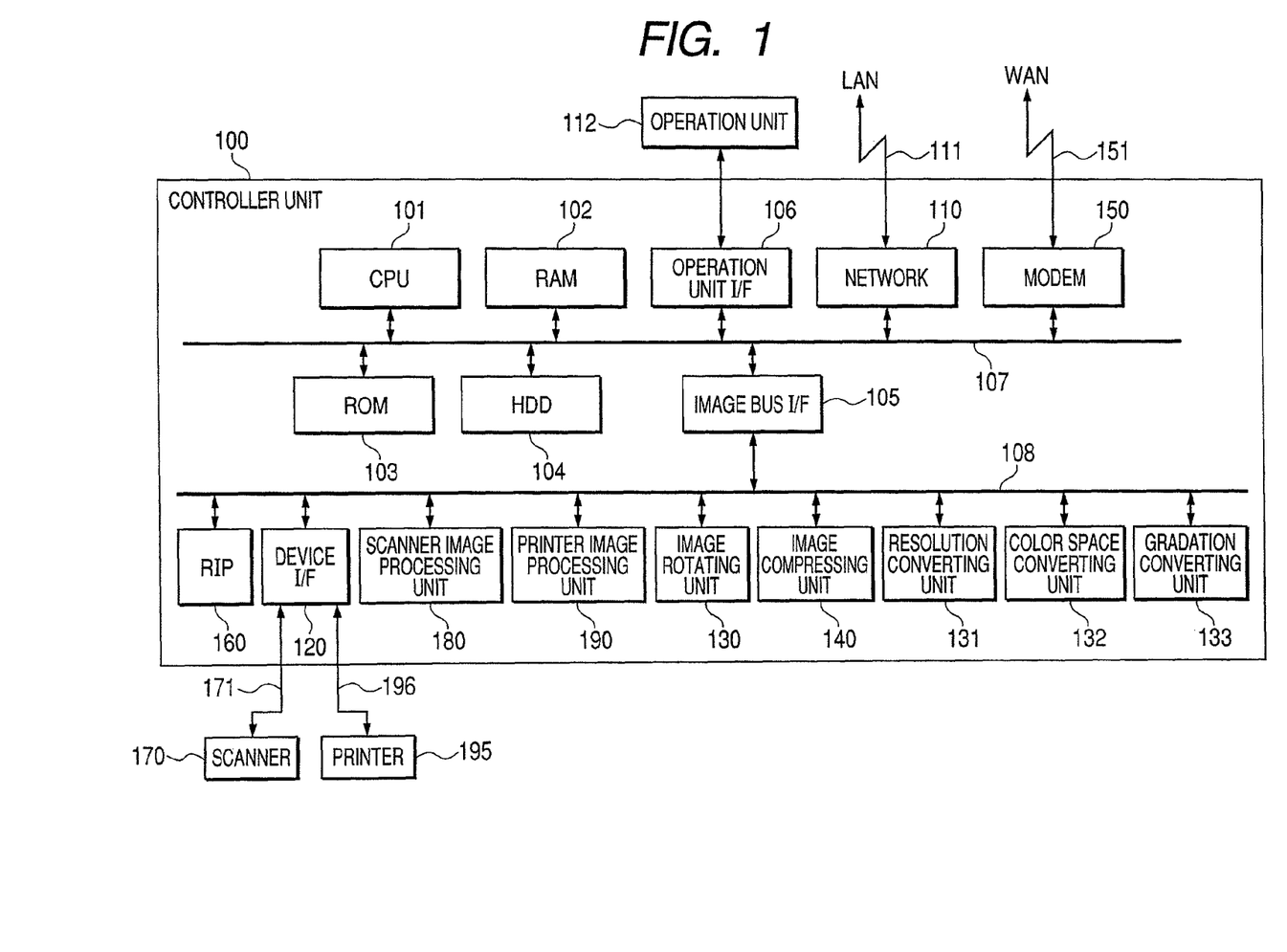
FIG. 1 is a block diagram for describing a construction of an image forming apparatus illustrating a first embodiment of the invention.

FIG. 1 is a block diagram for describing a construction of an image forming apparatus showing the first embodiment of the invention. In the embodiment, an example of an MFP (Multi Function Peripheral) is shown as an image forming apparatus.

In FIG. 1, in a controller unit (CU) 100, a scanner 170 as an image input device and a printer 195 as an image output device are connected through a device interface (I/F) 120. By connecting to one of a LAN 111 and a public line (WAN) 151, the controller unit 100 outputs and inputs image information and device information to/from external apparatuses. "External apparatuses" include another MFP, a facsimile apparatus, a client PC (personal computer), a server apparatus, and the like.

In the CU 100, a CPU 101 is a controller for controlling the whole system. A RAM 102 is a system work memory which is used for the CPU 101 to operate. The RAM 102 is also an image memory for temporarily storing image data. A ROM 103 is a boot ROM in which a boot program for the system has been stored.

The image data is stored into a hard disk drive (HDD) 104. An operation unit I/F 106 is an interface unit for an operation unit (UI) 112 and outputs the image data to be displayed on the operation unit 112 to the operation unit 112. A network 110 is connected to the LAN 111 and inputs and outputs information.

A modem 150 is connected to the public line 151 and outputs and inputs information to/from the external MFP and the facsimile apparatus. The above-mentioned devices are arranged on (connected to) a system bus 107.

An image bus I/F 105 is a bus bridge for connecting the system bus 107 to an image bus 108 for transferring the image data at a high speed and converting a data structure. The image bus 108 is constructed by, for example, one of a PCI bus and IEEE1394. The following devices are arranged on (connected to) the image bus 108.

A raster image processor (RIP) 160 develops a PDL code into a bit map image. The device I/F unit 120 connects the scanner 170 and printer 195 as image input/output devices to the Cu 100 and synchronously/asynchronously converts the image data.

A scanner image processing unit 180 corrects, modifies, or edits the input image data. The scanner image processing unit 180 also has a function for discriminating whether the input image is a color original document or a monochromatic original document based on a saturation signal and holding a discrimination result.

A printer image processing unit 190 corrects, modifies, or edits output image data. An image rotating unit 130 reads the image from the scanner and, at the same time, rotates the image, stores it into the RAM 102, rotates the image in the RAM 102, and stores it into the RAM 102 in an interlocking relational manner with the scanner image process. The image rotating unit 130 can also print and output the image data in the RAM 102 while rotating it in an interlocking relational manner with the printer image processing unit 190.

A resolution converting unit 131 resolution-converts the image in the memory and stores into the memory. A color space converting unit 132 converts, for example, a YUV image in the RAM 102 into a Lab image by a matrix arithmetic operation and stores into the RAM 102.

A gradation converting unit 133 converts, for example, the 8-bit 256-gradation image in the RAM 102 into a 1-bit 2-gradation image by an error diffusion process or the like and stores into the RAM 102. An image compressing unit 140 executes a compressing/decompressing process of JPEG to multi-value image data and executes a compressing/decompressing process of JBIG, MMR, MR, or MH to binary image data.

The image rotating unit 130, resolution converting unit 131, color space converting unit 132, gradation converting unit 133, and image compressing unit 140 can operate in an interlocking relational manner with each other. Therefore, for example, in the case of executing the image rotation and resolution conversion to the image in the RAM 102, both processes can be executed without passing through the RAM 102.

Figure 2A:
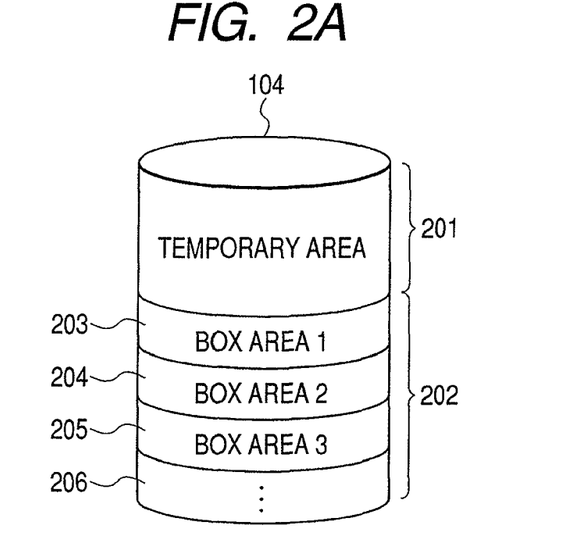
FIG. 2A is a schematic diagram for describing a storage area in an HDD 104 illustrated in FIG. 1.

As illustrated in FIG. 2A, a storage area in the HDD 104 is logically divided into a temporary area 201 and a Box area 202.

FIG. 2A is a schematic diagram for describing the storage area in the HDD 104 illustrated in FIG. 1.

In FIG. 2A, the temporary area 201 is an area for temporarily storing PDL development data or the image data from the scanner 170 in order to change output order of the image data or to enable the image data to be output by one scan in an output of a plurality of copy prints.

The Box area 202 is an area which is used for the Box function and is divided into a predetermined number of storage areas.

In the embodiment, it is assumed that the Box area 202 has been divided into storage areas 203 to 206.

Corresponding Box number and Box name have been allocated to each of the storage areas 203 to 206. Further, such a first setting that, when the image data is put into the storage area, printing, transmission, movement, processes in which those processes have been combined, or the like is automatically executed has been set into each of the storage areas 203 to 206 and hot-foldered. As a second setting, a notification to the user has been made to each of the storage areas 203 to 206. That is, a specific function to be executed for the information stored in each of the storage areas 203 to 206 can be set into each of the storage areas 203 to 206 by the function of the operation unit 112 or a printer driver of the client PC (not shown). Such a setting can be also realized by a function of a management utility of the client PC (not shown). Further, in the following description, there is a case where the Box in which the specific function has been set as mentioned above is called a "hot folder".

As a specific function which is set by the operation unit 112, it is also possible to use a construction in which the function having high generality has previously been registered as a file and the function is set in such a form that the file is selected or a part of the function of the selected file is changed. As an example of the file having the functions of high generality, there is an E-mail in which after the stored information was printed, the information is attached according to a designated address and transmitted, or the like.

As for such a specific function process, it is also possible to construct in such a manner that the user selects the information displayed as an icon on the operation unit 112, so that he can make a desired complex setting to one Box.

Further, control can be made in such a manner that the specific functions set in the storage areas 203 to 206 are displayed as a list through a UI display screen (not shown) and the Boxes in which the specific functions have been set and the Boxes in which the specific functions are not set are displayed so that they can be discriminated.

Figure 2B:
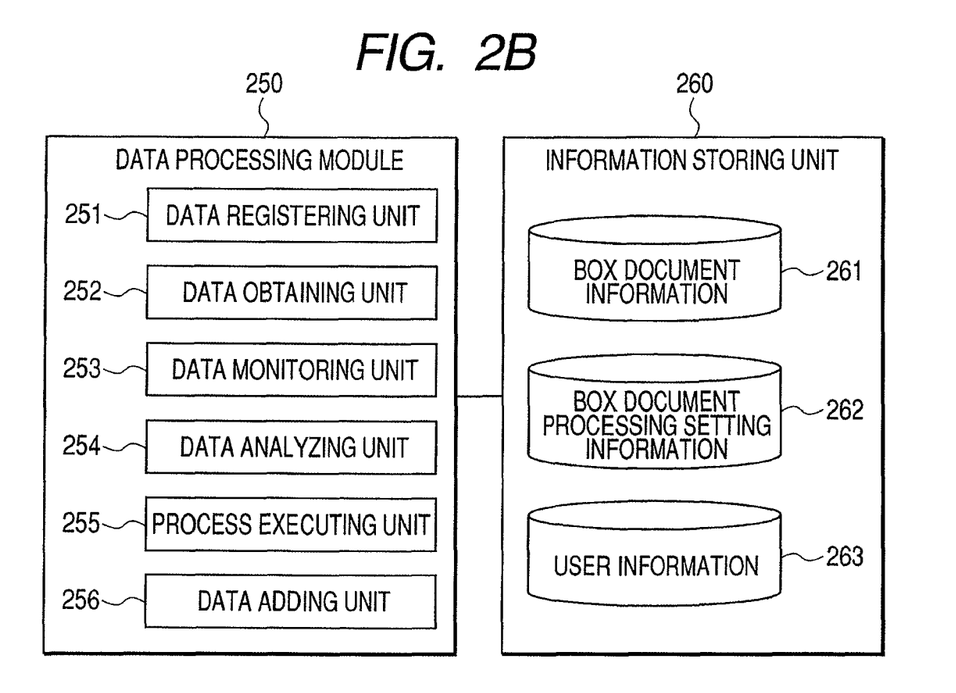
FIG. 2B is a block diagram for describing a construction of Box process software which is executed by the image forming apparatus illustrated in FIG. 1.

FIG. 2B is a block diagram for describing a construction of Box process software which is executed by the image forming apparatus illustrated in FIG. 1.

Various kinds of software, which will be described hereinbelow, have been stored in the HDD 104 illustrated in FIG. 1. Those kinds of software are developed in the RAM 102 and executed by the CPU 101, so that various kinds of Box processing functions are executed.

In the embodiment, the Box processing software is mainly constructed by a data processing module 250 and an information storing unit 260.

In FIG. 2B, the data processing module 250 includes a data registering unit 251, a data obtaining unit 252, a data monitoring unit 253, a data analyzing unit 254, a process executing unit 255, and a data adding unit 256.

The data registering unit 251 executes a process for registering the data into the information storing unit 260. The data obtaining unit 252 obtains the data from the information storing unit 260. The data monitoring unit 253 monitors the data in the information storing unit 260.

The data analyzing unit 254 analyzes the data. The process executing unit 255 executes a data process such as notifying process, moving/deleting process, or the like. The data adding unit 256 executes a process for adding new information to the data.

Box information 261 as information of the Box and a document in the Box, Box document processing setting information 262 as a process setting of the Box document, and user information 263 as information of the user have been managed in the information storing unit 260. The user information is information held in the areas 203 to 206 illustrated in FIG. 2A. As what is called owner information, an owner ID, a document ID, a document name, an E-mail address of the user, and the like have been managed as a management table (not shown) in the temporary area 201.

In the embodiment, the image forming apparatus illustrated in FIG. 1 is constructed in such a manner that the specific process to be executed for each of the storage areas 203 to 206 into the information which is put into one of the plurality of storage areas 203 to 206 can be set. The specific process can be set into each of the storage areas 203 to 206 by an administrator's authority or a user authority. As what are called hot folder functions, for example, there are a setting in which the image data is printed in the storage area 203 and moved to the storage area 204, a setting in which the image data is printed in the storage area 204 and moved to the storage area 203, and the like. Consequently, a combination of the user's desired functional processes can be registered as a specific process.

The data monitoring unit 253 detects that the user has put the information into one of the storage areas by the operation on the operation unit 112 as mentioned above. According to a detection result, the data analyzing unit 254 discriminates whether or not the loop information showing the loop state where the same specific process is repeated while moving the information between ones of the storage areas has been set in the history information set in the attribute information which is put.

If the data analyzing unit 254 determines that the loop information is not set in the history information, the process executing unit 255 executes the first process for executing the specific process. If it is determined that the loop information has been set, the process executing unit 255 executes the second process different from the first process.

The second process is a notifying process for notifying the user that the apparatus is in the loop state or a process for stopping the first process. Further, the second process is a process for deleting one of the information stored in the storage area in which the information is put.

In the embodiment, the loop information is information for discriminating the storage areas 203 to 206. A specific embodiment will be described in detail hereinbelow.

Figure 3:
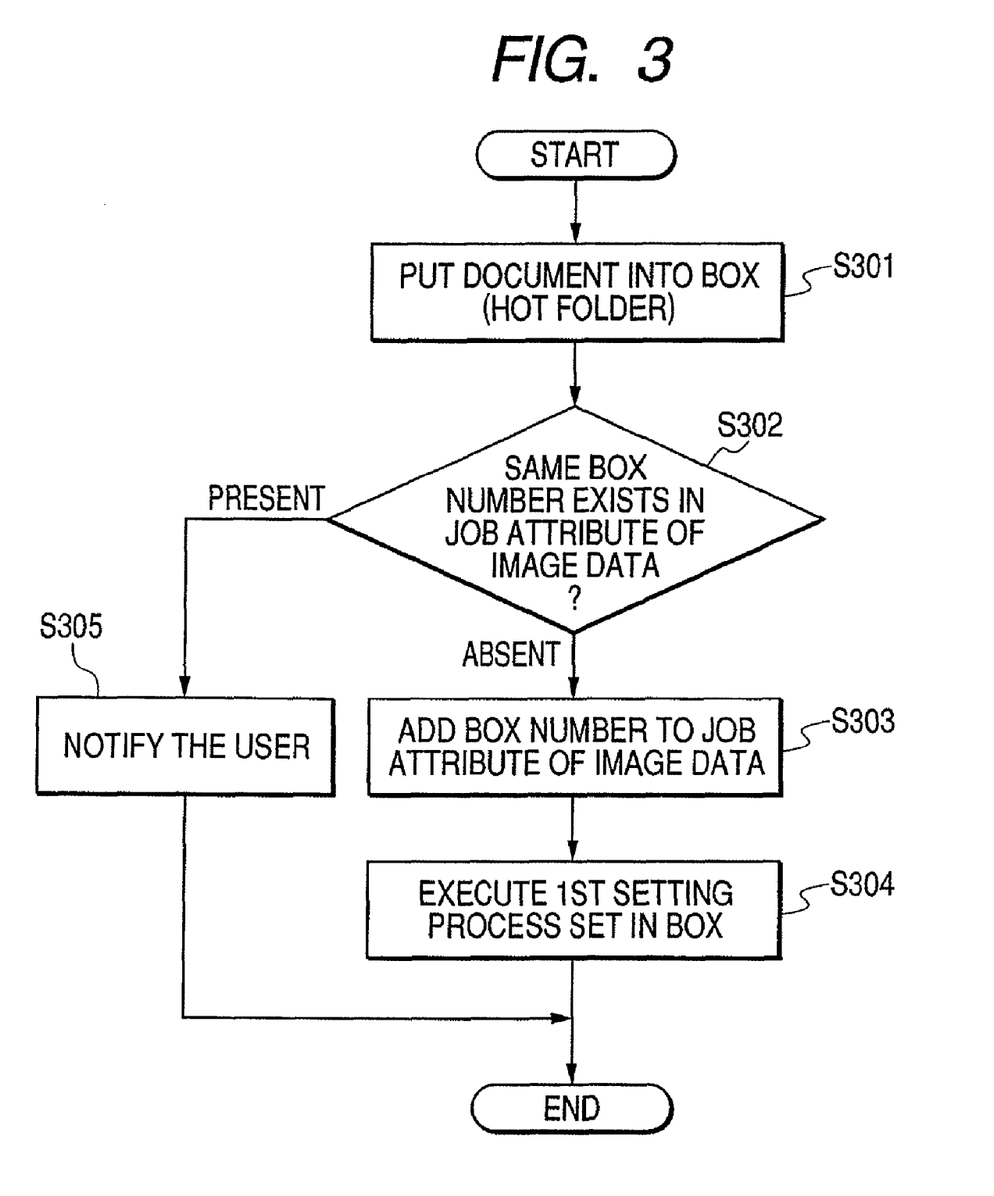
FIG. 3 is a flowchart illustrating an example of a first data processing procedure in the image forming apparatus showing the embodiment.

FIG. 3 is a flowchart illustrating an example of the first data processing procedure in the image forming apparatus showing the embodiment. This example shows a process which the data processing module 250 executes to the Box of the information storing unit 260, after the data monitoring unit 253 illustrated in FIG. 2B detects that the image data has been input.

S301 to S305 denote processing steps. Each of the processing steps is realized by a method whereby a control program stored in the ROM 103 or the HDD 104 is loaded into the RAM 102 and the CPU 101 executes the control program.

In the image data, as information showing a job history, the Box number of the Box in which the image data has been registered is added to the processing history of the attribute. By this, it can be discriminated, with reference to the added Box number, that the image data has been moved between the Boxes by the job process.

In S301, the data registering unit 251 puts the image data into one of the hot-foldered Box areas. The image data putting is performed through scanning of a paper document in the scanner 170, transmission using the LAN 111, movement between the Box areas, or the like. However, it is not limited to them.

In S302, the data obtaining unit 252 obtains the attribute information of the image data registered in the Box into which the image data is put. The data analyzing unit 254 analyzes the attribute information. As information showing the foregoing job history, the Box number of the Box in which the image data had been registered has been added to the processing history of the attribute in the attribute information, since the data analyzing unit 254 analyzes the Box number as its history information.

That is, the data analyzing unit 254 discriminates whether or not the same Box number exists in the Box area where the image data has been stored at present. If it is determined here that the same Box number as the analyzed Box number does not exist (Absent in S302), the processing routine advances to S303. If it is determined that the same Box number exists (Present in S302), the processing routine advances to S305. If it is determined here that the same Box number as the analyzed Box number does not exist in the attribute information of the image data which is input, this means that a history showing that the image data to be put has already been registered before in the Box into which the image data is put does not exist. Therefore, even if such image data is registered into the Box, such a problem that the same process is repeated as pointed out in the paragraphs of the problem is eliminated.

In S303, the data adding unit 256 adds the Box number of the Box area in which the image data has been stored at present to the attribute information of the image data.

Subsequently, in S304, the process executing unit 255 executes the first setting process set in the Box area in which the data has been stored at present. The present processing routine is finished. The first setting process will be described hereinafter in FIG. 4.

Since S305 shows the case where it is determined that the same Box number exists, the process executing unit 255 loops. Therefore, a message showing that the first setting process is not executed is displayed onto the operation unit 112 and the processing routine is finished. In this case, it is desirable to add control so as to display such a message onto the operation unit 112 together with the reason why the first setting process is not executed.

The information is not displayed onto the operation unit 112 but another notifying process may be executed. For example, control can be also made in such a manner that the E-mail address is preliminarily added to the attribute information of the image data, the user is notified of the information by E-mail through the LAN 111 by using the E-mail address in the user information 263 stored in the information storing unit 260, or the like.

Figure 4:
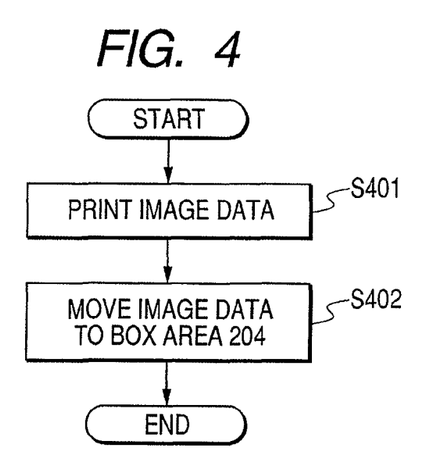
FIG. 4 is a flowchart illustrating an example of a second data processing procedure in the image forming apparatus showing the embodiment.

FIG. 4 is a flowchart illustrating an example of the second data processing procedure in the image forming apparatus showing the embodiment. This embodiment relates to an example of the first setting process as Box document processing setting information 262 which is executed by the process executing unit 255 when the image data is put into the Box area 203 illustrated in FIG. 2A. S401 and S402 denote processing steps. Each of the processing steps is realized by a method whereby a control program stored in the ROM 103 or the HDD 104 is loaded into the RAM 102 and the CPU 101 executes the control program.

In S401, the printer 195 is controlled so as to print the image data which has been put into the Box area 203. In S402, the image data is moved to the Box area 204. The present processing routine is finished.

Figure 5:
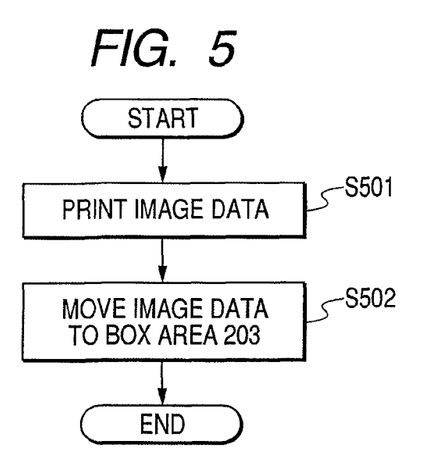
FIG. 5 is a flowchart illustrating an example of a third data processing procedure in the image forming apparatus showing the embodiment.

FIG. 5 is a flowchart illustrating an example of the third data processing procedure in the image forming apparatus showing the embodiment. This embodiment relates to an example of the second setting process as Box document processing setting information 262 which is executed by the process executing unit 255 when the image data is put into the Box area 204 illustrated in FIG. 2A.

S501 and S502 denote processing steps. Each of the processing steps is realized by a method whereby a control program stored in the ROM 103 or the HDD 104 is loaded into the RAM 102 and the CPU 101 executes the control program.

First, in S501, the printer 195 is controlled so as to print the image data which has been put into the Box area 204. In S502, the image data is moved to the Box area 203. The present processing routine is finished.

By executing the first setting process shown in FIG. 4 and the second setting process shown in FIG. 5, the printing of the printed image data is cyclically executed and the printing process is continuously executed so that the image data is sequentially moved along a path of the storage area 203→the storage area 204→the storage area 203. In other words, unless the process as shown in FIG. 3 is executed, the loop process as pointed out in the paragraphs of the problem is executed.

Figure 6:
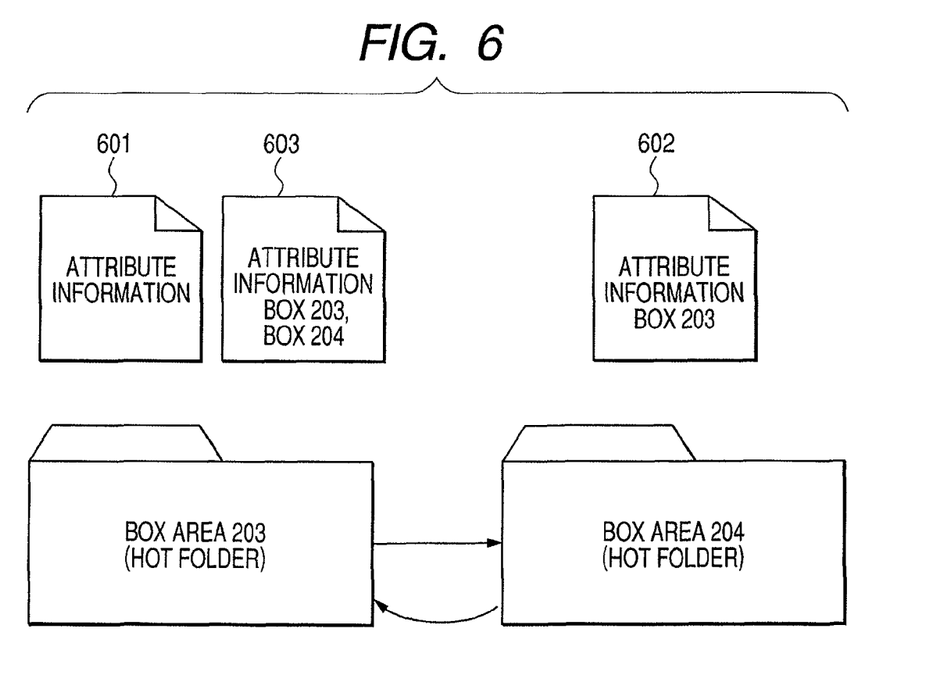
FIG. 6 is a conceptual diagram illustrating a first specific process execution example in the image forming apparatus showing the embodiment.

FIG. 6 is a conceptual diagram illustrating an example of the first specific process execution in the image forming apparatus showing the embodiment. This embodiment relates to an example illustrating a change in attribute information when the image data is moved between the storage area 203 and the storage area 204.

In FIG. 6, attribute information 601 of the image data when the document is first put into the storage area 203 is shown. That is, since the Box number is not added to the attribute information 601, the Box number of the storage area 203 is added to the attribute information of the image data in S303 shown in FIG. 3. In S304, the printing and the movement to the storage area 204 as a first setting of the storage area 203 shown in FIG. 4 are executed.

Attribute information 602 of the image data when the document is moved from the storage area 203 to the storage area 204 is shown. Since only the Box number of the storage area 203 exists in the attribute information of the image data in S303 mentioned above, the Box number of the storage area 204 is further added to the attribute information of the relevant image data in S303. In S304, the printing and the movement to the storage area 203 as a second setting of the storage area 204 shown in FIG. 5 are executed.

Attribute information 603 of the image data when the document is moved from the storage area 204 to the storage area 203 is shown.

Since the Box number of the storage area 203 has already been added to the attribute information of the image data here, the loop of the same specifying process is detected in S302. In S305, the user is notified that the relevant image data is not registered to the Box number of the storage area 203.

In the embodiment, the setting of the process has previously been made to the Box areas. Naturally, it is also possible to construct in such a manner that when the first setting and the second setting are made to the Box areas, the image data is put and the setting to confirm whether or not the loop has occurred is made.

According to the foregoing first embodiment, if the setting "after the image data was printed, the image data is moved to another Box area" is made to the Box area assured in the HDD 104 of the MFP, the processing loop which is caused by the erroneous setting can be detected. Therefore, there is such an effect that the wasteful printing and transmission can be prevented.

Second Embodiment

The first embodiment has been described above with respect to the case where the invention is applied to the process for moving the image data to the Box area in the same MFP or the like. However, there is also a case where the MFP is connected to the LAN and constructed as a system. Therefore, in a system in which a plurality of MFPs can mutually communicate through the LAN or the like, a case of applying the invention to the specific process between the Box areas assured in the HDD of each MFP will be described.

Figure 7:
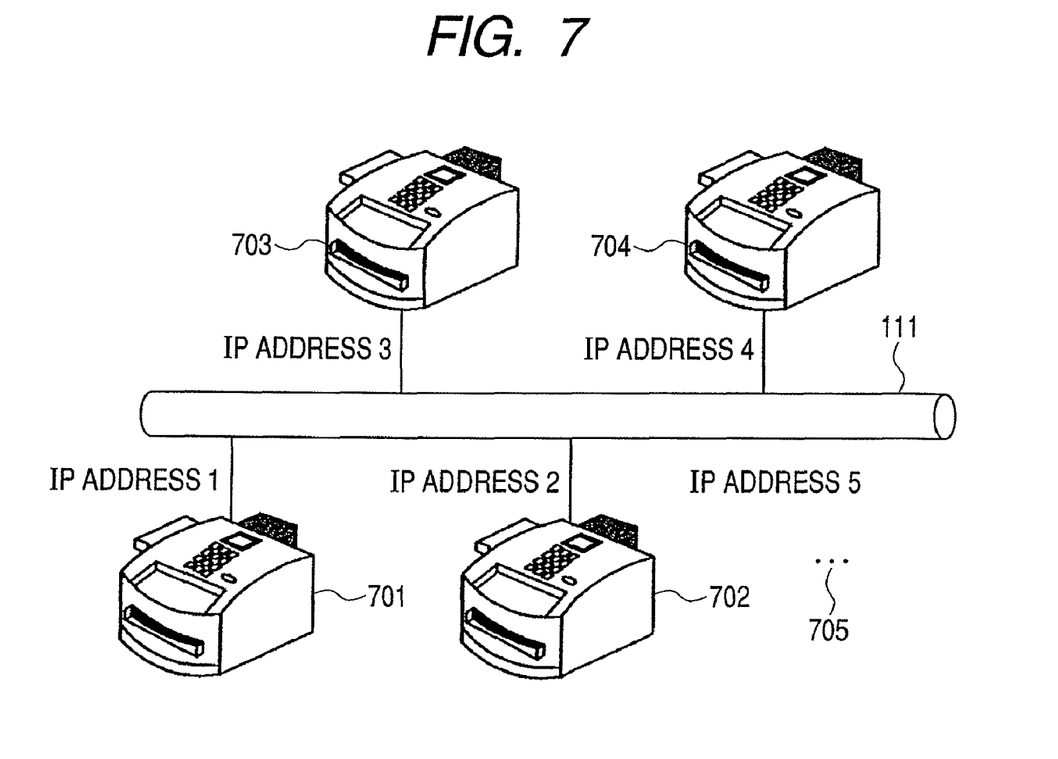
FIG. 7 is a diagram illustrating an example of an image forming system to which an image forming apparatus showing a second embodiment of the invention is applied.

In the embodiment, each image forming apparatus is constructed in such a manner that the specific process to be executed for each of the storage areas 203 to 206 for the information which is put into one of a plurality of storage areas 203 to 206 as illustrated in FIG. 7 can be set. The specific process can be set into each of the storage areas 203 to 206 by the administrator's authority or the user authority. As what are called hot folder functions, for example, there are the setting in which the image data is printed in the storage area 203 and moved to the storage area 204, the setting in which the image data is printed in the storage area 204 and moved to the storage area 203, and the like. Consequently, a combination of the user's desired functional processes can be registered as a specific process.

The data monitoring unit 253 detects that the user has put the information into one of the storage areas from one of the image forming apparatuses by the operation on the operation unit 112 as mentioned above. According to a detection result, the data analyzing unit 254 discriminates whether or not the loop information showing the loop state where the same specific process is repeated while moving the information between ones of the storage areas has been set in the history information set in the attribute information of the information which is put.

If the data analyzing unit 254 determines that the loop information is not set in the history information, the process executing unit 255 executes the first process for executing the specific process. If it is determined that the loop information has been set, the process executing unit 255 executes the second process different from the first process.

The second process is the notifying process for notifying the user that the apparatus is in the loop state or the process for stopping the first process. Further, the second process is a process for deleting one of the information stored in the storage area in which the information is put.

In the embodiment, the loop information is a combination of the information for discriminating one of the storage areas 203 to 206 of one of the image forming apparatuses and IP address information for specifying one of the image forming apparatuses. A specific embodiment will be described in detail hereinbelow.

FIG. 7 is a diagram illustrating an example of an image forming system to which an image forming apparatus showing the second embodiment of the invention is applied. This embodiment relates to the image forming apparatus having: the hardware illustrated in FIG. 1; the HDD 104 illustrated in FIG. 2A; and the software and the data file illustrated in FIG. 2B. The image forming apparatus is an MFP similar to that in the first embodiment here.

In FIG. 7, MFPs 701 to 705 are connected to the LAN 111 through the network 110. Data can be transmitted and received among the MFPs 701 to 705, respectively.

An IP address 1, an IP address 2, an IP address 3, an IP address 4, and an IP address 5 have sequentially been preset in the MFPs 701 to 705, respectively.

Although the case where the MFPs 701 to 705 are connected to the LAN 111 is shown in the embodiment, one of the MFPs may be connected to another LAN or the like through a gateway.

Figure 8:
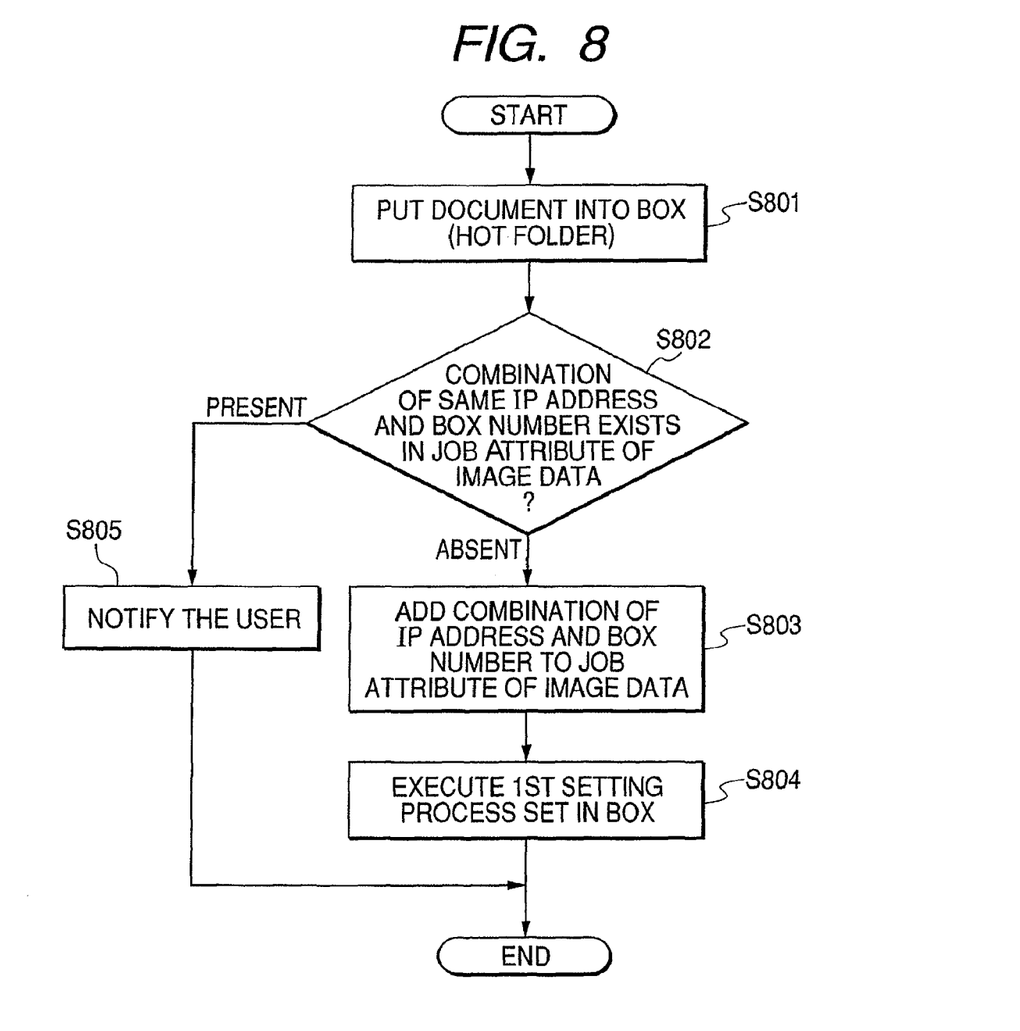
FIG. 8 is a flowchart illustrating an example of a fourth data processing procedure in the image forming apparatus showing the embodiment.

FIG. 8 is a flowchart illustrating an example of the fourth data processing procedure in the image forming apparatus showing the embodiment. This embodiment relates to a processing example in which after detecting that the image data was put into the HDD 104, the image data is set into the Box area.

S801 to S805 denote processing steps. Each of the processing steps is realized by a method whereby a control program stored in the ROM 103 or the HDD 104 is loaded into the RAM 102 and the CPU 101 executes the control program.

In the image data, as information showing a job history, the Box number of the Box in which the image data has been registered and the IP address are added to the processing history of the attribute. Thus, it can be discriminated, by referring to the added Box number and IP address, that the image data has been moved between the Boxes by the job process.

First, in S801, the data registering unit 251 puts the image data into one of the hot-foldered Box areas. The image data putting is performed through scanning of the paper document in the scanner 170, transmission using the LAN 111, movement between the Box areas, or the like.

In S802, the data analyzing unit 254 discriminates whether or not a combination of the IP address of the MFP in which the image data has been stored at present and the Box number of the Box area exists in the attribute information of the image data. If it is determined here that the combination of the IP address of the MFP and the Box number of the Box area does not exist (Absent in S802), the processing routine advances to S803. If it is determined here that the combination of the IP address of the MFP and the Box number of the Box area exists (Present in S802), the processing routine advances to S805. The example of the IP address has been shown here as attribute information to be discriminated. Naturally, the attribute information is not limited to the IP address but an arbitrary identifier such as an MAC address or the like can be also used so long as it can specify the MFP.

In S803, the data adding unit 256 adds the IP address of the MFP in which the image data has been stored at present and the Box number of the Box area to the attribute information of the image data to be put.

Subsequently, in S804, the process executing unit 255 executes the third setting process set in the Box area which has been stored at present. The present processing routine is finished. The third setting process will be described hereinafter in FIG. 9.

If it is determined in S802 that the combination of the IP address of the MFP and the Box number of the Box area exists (Present in S802), it is determined that the process executing unit 255 has looped. The third setting process registered for the image data whose input has been instructed is not executed but a message showing such a fact is displayed onto the operation unit 112 and the user is notified of it. The present processing routine is finished.

The information is not displayed onto the operation unit 112 but it is also possible to construct in such a manner that the E-mail address is preliminarily added to the attribute information of the image data and the user is notified of the information by the E-mail. Specifically speaking, it is possible to construct in such a manner that the user is notified of the information by the E-mail through the LAN 111 by using the E-mail address in the user information 263 stored in the information storing unit 260.

Figure 9:
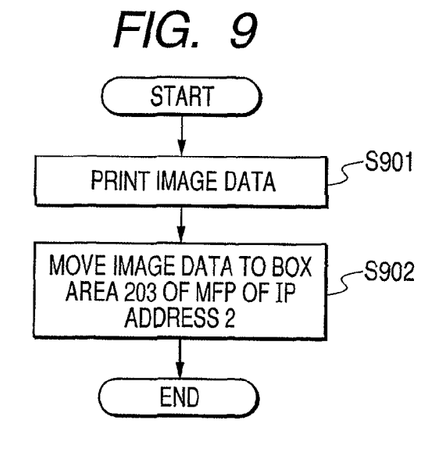
FIG. 9 is a flowchart illustrating an example of a fifth data processing procedure in the image forming apparatus showing the embodiment.

FIG. 9 is a flowchart illustrating an example of the fifth data processing procedure in the image forming apparatus showing the embodiment. This embodiment relates to an example of the third setting process in which the apparatus operates when the image data is put into the storage area 203 in the MFP 701 of the IP address 1.

S901 and S902 denote processing steps. Each of the processing steps is realized by a method whereby a control program stored in the ROM 103 or the HDD 104 is loaded into the RAM 102 and the CPU 101 executes the control program.

First, in S901, the printer 195 is controlled so as to print the image data which has been put into the storage area 203. In S902, the image data is moved to the storage area 203 in the MFP 702 of the IP address 2. The present processing routine is finished.

Figure 10:
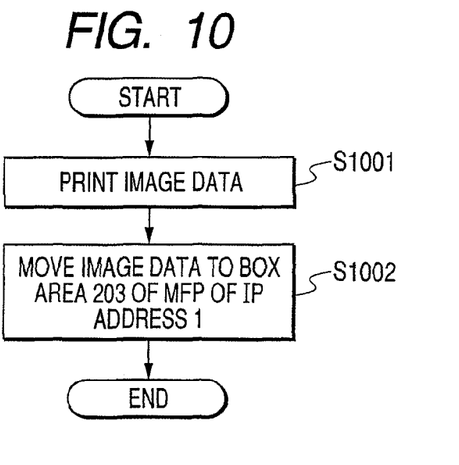
FIG. 10 is a flowchart illustrating an example of a sixth data processing procedure in the image forming apparatus showing the embodiment.

FIG. 10 is a flowchart illustrating an example of the sixth data processing procedure in the image forming apparatus showing the embodiment. This embodiment relates to an example of the fourth setting process in which the apparatus operates when the image data is put into the storage area 203 in the MFP 702 of the IP address 2.

First, in S1001, the printer 195 is controlled so as to print the image data which has been put into the storage area 203 in the MFP 702. In S1002, the image data is moved to the storage area 203 in the MFP 701 of the IP address 1. The present processing routine is finished.

Figure 11:
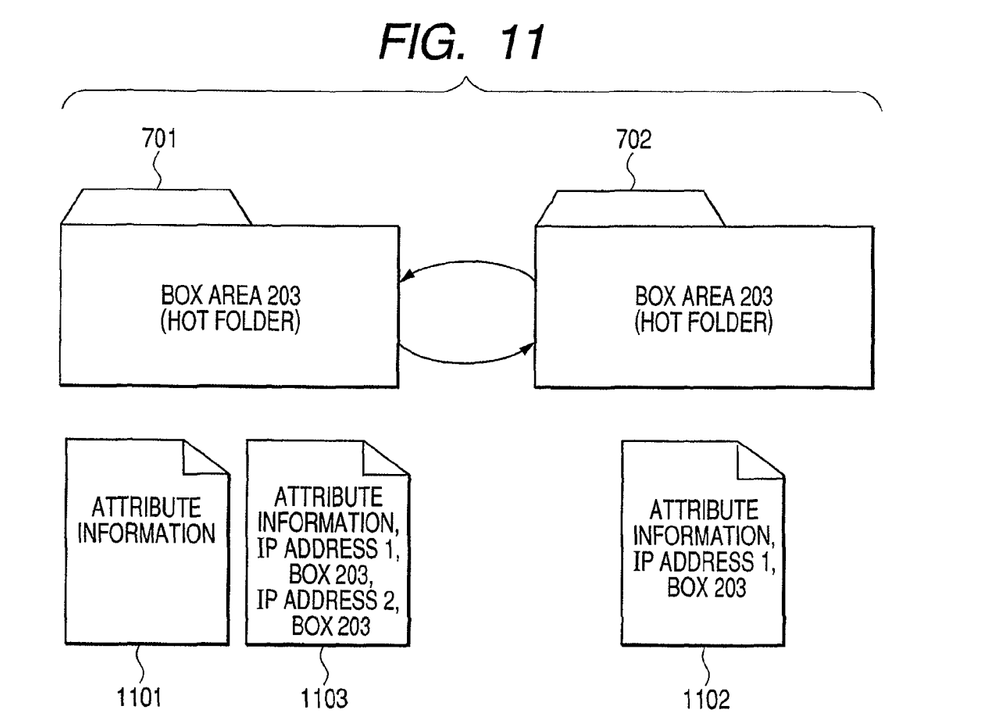
FIG. 11 is a conceptual diagram illustrating a second specific process execution example in the image forming apparatus showing the embodiment.

FIG. 11 is a conceptual diagram illustrating the second specific process execution example in the image forming apparatus showing the embodiment. This embodiment relates to an example showing a change in attribute information accompanied with the movement of the image data after the image data was put into the storage area 203 in the MFP 701.

In FIG. 11, attribute information 1101 of the image data which is obtained when the document is first put into the storage area 203 in the MFP 701 is shown. Since the combination of the IP address 1 and the Box number does not exist in the attribute information 1101, the discrimination result of S802 is "Absent". The data adding unit 256 adds the combination of the IP address 1 and the Box number of the storage area 203 to the attribute information in S803. The printing and the movement of the image data to the storage area 203 in the MFP 702 as a third setting of the storage area 203 in the MFP 701 illustrated in FIG. 9 are executed in S804.

Attribute information 1102 of the image data which is obtained when the image data is moved from the storage area 203 in the MFP 701 to the storage area 204 in the MFP 702 is shown. Since only the combination of the IP address 1 and the Box number of the storage area 203 exist in the attribute information 1102, the discrimination result of S802 is "Absent". The combination of the IP address 1 and the Box number of the storage area 204 are added to the attribute information in S803. The printing and the movement of the image data to the storage area 203 in the MFP 701 as a third setting of the storage area 203 in the MFP 702 illustrated in FIG. 10 are executed in S804.

Attribute information 1103 of the image data which is obtained when the image data is moved from the storage area 203 in the MFP 702 to the storage area 203 in the MFP 701 is shown. Since the combination of the IP address 1 and the Box number of the storage area 203 already exist in the attribute information 1103 in S802, the loop is detected. The discrimination result of S802 is "Present". In S805, the user is notified that the printing and the movement of the image data to the storage area 203 in the MFP 701 as a fourth setting illustrated in FIG. 10 are not executed. The present processing routine is finished.

Although the process has been preset into the Box area in the embodiment, naturally, it is also possible to construct in such a manner that when a third setting and a fourth setting are made to the Box area, the image data is put and whether or not the loop has occurred is confirmed.

According to the above second embodiment, when the setting "after the image data was printed, the image data is moved to a Box area in another MFP" is made to the Box area in the MFP, the processing loop which is caused by the erroneous setting can be detected. Therefore, there is such an effect that the wasteful printing and transmission can be prevented.

Another Embodiment

The above first and second embodiments have been described with respect to the case of making control so as to stop the specific process set in the Box area into which the image data is put when the loop is detected. In place of such control, it is also possible to control in such a manner that when the loop is detected, the image data whose attribute coincides with that of the image data which is put and which has already been registered is selected and deleted.

Thus, according to the contents which are notified to the user in the first and second embodiments, the deleting process of the image data based on the deletion to be instructed by the user through the operation unit 112 is automatized and use convenience of the user may be improved.

The second embodiment has been described above with respect to the case where when the specific process for the Box areas assured in the HDDs of a plurality of MFPs has been looped through the network, the looped specific process is limited.

However, there are not only the cases where only the MFPs are not always connected to the network system but also the case where the client PC, sole scanner apparatus, and sole printer apparatus which execute the data process are connected to the network.

There can be also a specific process which uses the client PC, sole scanner apparatus, and sole printer apparatus as network devices.

That is, there can be also such a specific process that the specific process set to the Box area is not only moved between the MFPs but also finally moved to the Box area of the MFP via the above network devices.

Therefore, as an application system, such a situation that the wasteful job using the network devices is executed can be also avoided by detecting the loop also including the specific process which is moved via the network devices.

In the foregoing embodiment, the process is actually executed, the loop is detected from the processing history, and the process is stopped or the image data is deleted. An example in which the loop is detected when the setting of the specific process to be executed has been registered into the information which is put into the storage area is shown here.

In this example, the MFP constructed as illustrated in FIG. 1 in a manner similar to that in the first embodiment is shown as an example. The storage area in the HDD 104 is logically divided as illustrated in FIG. 2A in a manner similar to that in the first embodiment. The specific process can be set into each of the storage areas 203 to 206 by the administrator's authority or the user authority. FIG. 2B is a block diagram illustrating a construction of Box process software which is executed by the image forming apparatus illustrated in FIG. 1. In the embodiment, temporary storage information (not shown) which temporarily stores the information further exists in the information storing unit 260. The temporary storage information is such information that the information is temporarily added by the data adding unit 256 and, when the loop detecting process is finished, the information is deleted.

The setting which is executed by the process executing unit 255 as shown in the flowchart of FIG. 4 has been made into the Box area 203. The Box document processing setting information 262 as its setting information has been stored in the information storing unit 260.

The user newly makes the setting which is executed by the process executing unit 255 as shown in the flowchart of FIG. 5 into the Box area 204 and registers the specific process.

Figure 13:
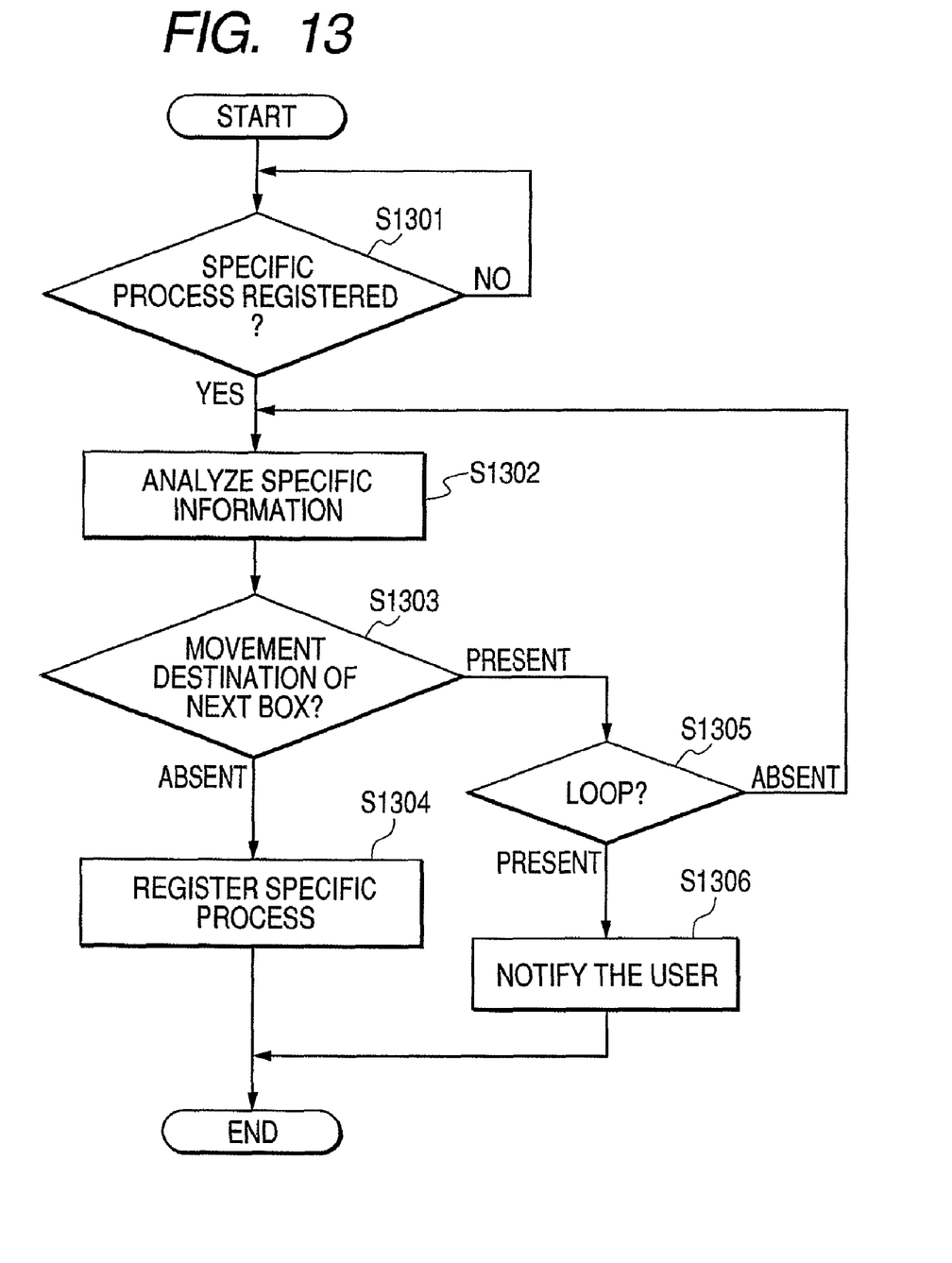
FIG. 13 is a flowchart illustrating an example of a seventh data processing procedure in the image forming apparatus showing the embodiment.

FIG. 13 is a flowchart illustrating an example of the seventh data processing procedure in the image forming apparatus showing the embodiment. This embodiment relates to the data processing procedure in the embodiment which is executed when the registering process is executed. S1301 to S1306 denote processing steps. Each of the processing steps is realized by a method whereby a control program stored in the ROM 103 or the HDD 104 is loaded into the RAM 102 and the CPU 101 executes the control program.

First, in S1301, the data monitoring unit 253 monitors whether or not the registration setting process of the specific process has been executed. If the registering process has been executed, the processing routine advances to S1302.

In S1302, the data analyzing unit 254 analyzes the set specific process. From an analysis result of S1302, the presence or absence of the next movement destination is discriminated in S1303. If it is determined that the next movement destination does not exist (Absent in S1303), the processing routine advances to S1304.

In S1304, the data registering unit 251 registers the set specific process into the box document processing setting information 262 in the information storing unit 260 as a specific process of the Box area 204 (storing unit).

If it is determined that the next movement destination exists (Present in S1303), the data adding unit 256 adds the information showing the location of the Box area such as a Box number or the like to the temporary storage information in the information storing unit 260. The processing routine advances to S1305.

In S1305, the data analyzing unit 254 analyzes the temporary storage information and discriminates the presence or absence of the same Box number.

If the same Box number exists in S1305, it is determined that the loop exists, and S1306 follows. The user is notified that the loop exists. For example, warning information such as "loop occurred" or the like is displayed onto the operation unit or the administrator's PC is notified by E-mail. The processing routine is finished without registering the set specific process as a specific process. In other words, the setting of the specific process which is made in S1301 is cancelled. Although the processing routine is finished without registering the set specific process in the embodiment, naturally, the user can be also allowed to discriminate whether or not the set specific process is registered.

If it is determined in S1305 that the same Box number does not exist (Absent), the data obtaining unit 252 obtains the Box document processing setting information 262 of the Box area of the next movement destination. The processing routine advances to S1302.

In the embodiment, the occurrence of the loop of the Box (storing unit) in the same image forming apparatus has been detected. Further, whether or not a loop has occurred between the Box (storing unit) in the external information processing apparatus which can communicate with the image forming apparatus and the Box in the image forming apparatus may be detected.

According to the foregoing examples, there is such an effect that when the setting is made, the loop can be detected and the wasteful printing and transmission can be prevented. That is, upon setting by the administrator, the loop of the transmission of the job can be prevented without waiting for the execution of the job.

A construction of a data processing program which can be read out by the image forming apparatus according to the invention will now be described with reference to a memory map illustrated in FIG. 12.

Figure 12:
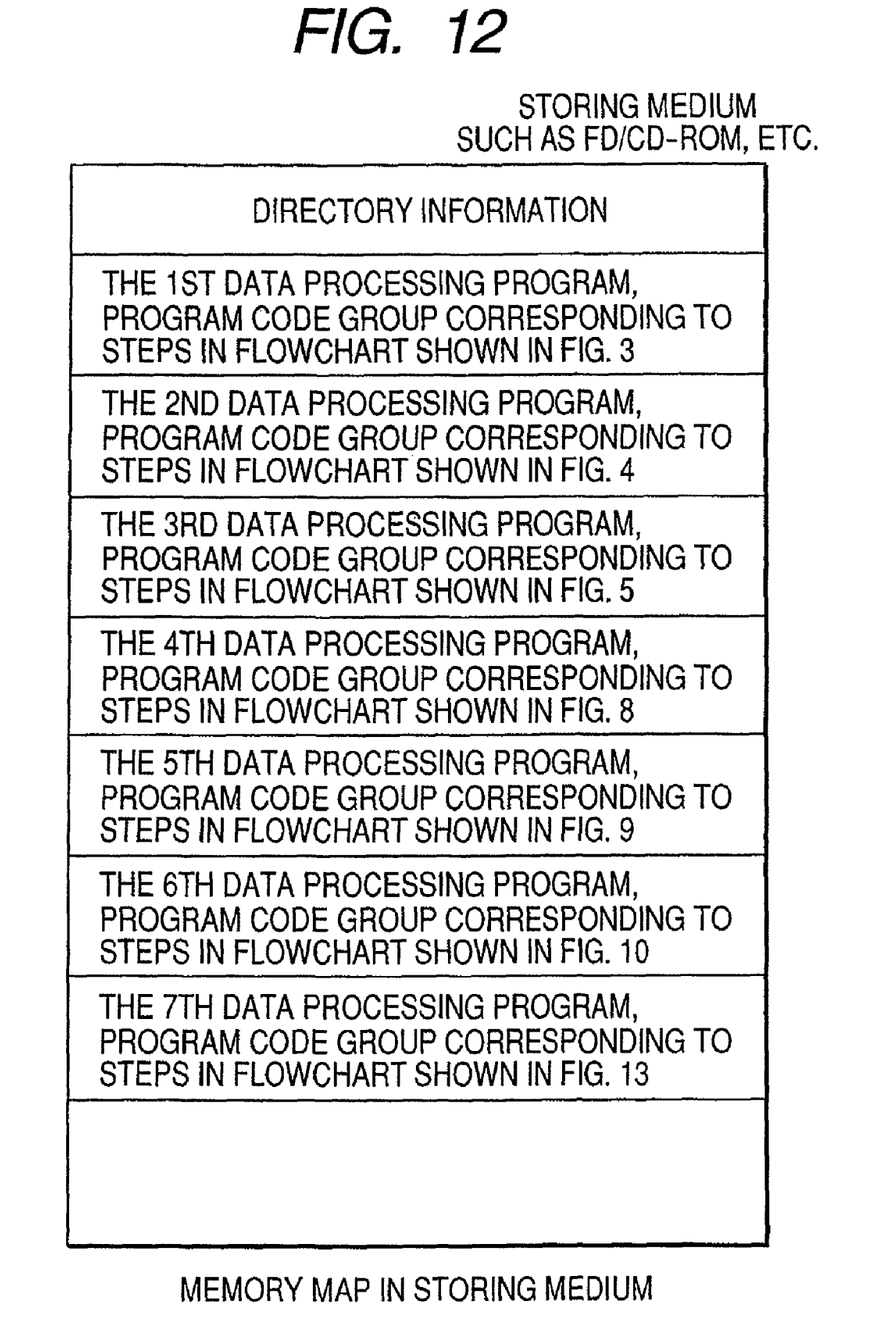
FIG. 12 is a diagram for describing a memory map in a storing medium for storing various data processing programs which can be read out by the image forming apparatus according to the invention.

FIG. 12 is a diagram for describing the memory map in a storing medium for the storing various data processing programs which can be read out by the image forming apparatus according to the invention.

Although not particularly illustrated, there is also a case where information which manages a program group stored in the storing medium, for example, version information, an implementor's name, and the like are stored and information which depends on the OS or the like of the program reading side, for example, icons for identifying and displaying the programs, and the like are also stored.

Further, data which belongs to the various programs is also managed in the directory. There is also a case where a program for installing the various programs into a computer and, in the case where the installing program has been compressed, a program for decoding it, and the like are also stored.

Further, the functions shown in FIGS. 3, 4, 5, 8, 9, 10, and 13 may be executed by a host computer by a program which is installed from the outside. In such a case, the invention is also applied to the case where an information group containing the program is supplied to an output apparatus by a storing medium such as CD-ROM, flash memory, FD, or the like or from an external storing medium through the network.

Naturally, the object of the invention is also accomplished by a method whereby the storing medium in which program codes of the software for realizing the functions of the embodiments mentioned above have been recorded is supplied to a system or an apparatus and a computer (or a CPU or an MPU) of the system or the apparatus reads out and executes the program codes stored in the storing medium.

In such a case, the program codes themselves read out of the storing medium realize the novel function of the invention. The storing medium in which the program codes have been stored constructs the invention.

Therefore, an arbitrary program such as object code, program which is executed by an interpreter, script data which is supplied to the OS, or the like can be used and a form of the program is not limited so long as it has the function of the program.

As a storing medium for supplying the program, for example, a flexible disk, a hard disk, an optical disk, a magnetooptic disk, an MO, a CD-ROM, a CD-R, a CD-RW, a magnetic tape, a non-volatile memory card, a ROM, a DVD, or the like can be used.

In this case, the program codes themselves read out of the storing medium realize the functions of the embodiments mentioned above. The storing medium in which the program codes have been stored constructs the invention.

As another program supplying method, the program can be also supplied by a method whereby a client computer is connected to Homepage on the Internet by using a browser of the client computer, and the computer program itself of the invention or a compressed file including an automatic installing function is downloaded from the Homepage to the recording medium such as a hard disk or the like. The program supplying method can be also realized by a method whereby the program codes constructing the program of the invention are divided into a plurality of files and each file is downloaded from different Homepage. That is, a WWW server, an ftp server, or the like for allowing a plurality of users to download the program file for realizing the functions and processes of the invention by the computer is also incorporated in Claims of the invention.

The program supplying method can be also realized by a method whereby the program of the invention is encrypted, stored into the storing medium such as a CD-ROM, and distributed to the users, and the users who can satisfy predetermined conditions are allowed to download key information for decrypting the encryption from Homepage through the Internet, and the encrypted program is executed by using the key information and installed to the computer.

Naturally, the invention incorporates not only the case where the computer executes the read-out program codes, so that the functions of the embodiments mentioned above are realized but also the case where, for example, an OS (Operating System) or the like which is operating on the computer executes a part or all of actual processes based on instructions of the program codes, and the functions of the embodiments mentioned above are realized by those processes.

Further, naturally, the invention incorporates the case where the program codes read out of the storing medium are written into a memory provided for a function expanding board inserted into a computer or a function expanding unit connected to the computer, and thereafter, a CPU or the like provided for the function expanding board or the function expanding unit executes a part or all of actual processes based on instructions of the program codes, and the functions of the embodiments mentioned above are realized by those processes.

The invention is not limited to the foregoing embodiments but many modifications (including an organic combination of the embodiments) based on the spirit of the invention are possible and are not excluded from the scope of the invention.

Although the various examples and embodiments of the invention have been shown and described, it will be understood by those skilled in the art that the spirit and scope of the invention are not limited to the specific description in the specification.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-243892, filed Sep. 8, 2006, which is hereby incorporated by reference herein in its entirety.

What is claimed is:

1. An image forming apparatus in which a specific process to be executed for information that is put into one of a plurality of storage areas can be set every storage area, the specific process including a movement process, the image forming apparatus comprising:
   a detecting unit configured to detect the input of the information into one of the storage areas;
   a setting unit configured to set history information of a process accompanied with the execution of the specific process into attribute information of the information;
   a loop discriminating unit configured to, if the input of the information into one of the storage areas is detected by the detecting unit, discriminate whether or not a loop state where the same specific process is repeated while moving the information between the ones of the storage areas has been set, by analyzing each of the history information set into the attribute information of the information which is put; and
   a process executing unit configured to execute a first process for executing the specific process if it is determined by the loop discriminating unit that the loop state has not been set and execute a second process different from the first process if it is determined that the loop state has been set.

2. An apparatus according to claim 1, wherein the second process is a notifying process for notifying the user that the loop state has been set.

3. An apparatus according to claim 1, wherein the second process is a process for stopping the first process.

4. An apparatus according to claim 1, wherein the second process is a process for deleting one of the information stored in one of the storage areas into which the information is put.

5. An information processing method for an image forming apparatus in which a specific process to be executed for information that is put into one of a plurality of storage areas can be set every storage area, the specific process including a movement process, the method comprising:
   a processor of the image forming apparatus functioning to perform the steps of:
   detecting the input of the information into one of the storage areas;
   setting history information of a process accompanied with the execution of the specific process into attribute information of the information;
   if the input of the information into one of the storage areas is detected in the detecting step, discriminating whether or not a loop state where the same specific process is repeated while moving the information between ones of the storage areas has been set, by analyzing each of the history information set into the attribute information of the information which is put; and
   executing a first process to execute the specific process if it is determined by the loop discriminating step that the loop state has not been set and executing a second process different from the first process if it is determined that the loop state has been set.

6. A method according to claim 5, wherein the second process is a notifying process for notifying the user that the loop state has been set.

7. A method according to claim 5, wherein the second process is a process for stopping the first process.

8. A method according to claim 5, wherein the second process is a process for deleting one of the information stored in one of the storage areas into which the information is put.

9. A non-transitory computer-readable storage medium that stores computer-executable code of a program for causing a computer to execute the information processing method according to claim 5.

* * * * *